United States Patent
Huang et al.

(10) Patent No.: US 9,506,625 B2
(45) Date of Patent: Nov. 29, 2016

(54) LIGHT SOURCE MODULE

(71) Applicants: Cal-Comp Electronics & Communications Company Limited, New Taipei (TW); Kinpo Electronics, Inc., New Taipei (TW)

(72) Inventors: Yen-Hsiang Huang, New Taipei (TW); Chih-Feng Lin, New Taipei (TW); Chun-Min Wang, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 97 days.

(21) Appl. No.: 14/691,593

(22) Filed: Apr. 21, 2015

(65) Prior Publication Data

US 2016/0169479 A1 Jun. 16, 2016

(30) Foreign Application Priority Data

Dec. 12, 2014 (TW) .............................. 103143497 A

(51) Int. Cl.
*F21V 1/00* (2006.01)
*F21V 7/04* (2006.01)
*F21V 7/00* (2006.01)
*F21Y 101/00* (2016.01)

(52) U.S. Cl.
CPC .............. *F21V 7/04* (2013.01); *F21V 7/0008* (2013.01); *F21V 7/0033* (2013.01); *F21Y 2101/00* (2013.01)

(58) Field of Classification Search
CPC ........ F21V 7/0008; F21V 7/0033; F21V 7/04; F21Y 2101/00
See application file for complete search history.

(56) References Cited

U.S. PATENT DOCUMENTS

| 8,197,105 | B2 | 6/2012 | Yang | |
|---|---|---|---|---|
| 8,651,692 | B2 | 2/2014 | Yang | |
| 2005/0140849 | A1* | 6/2005 | Hoelen | G02B 6/0038 349/65 |
| 2007/0070623 | A1* | 3/2007 | Laski | G02F 1/133603 362/235 |
| 2007/0240346 | A1* | 10/2007 | Li | G09F 13/20 40/544 |

* cited by examiner

*Primary Examiner* — Ali Alavi
(74) *Attorney, Agent, or Firm* — Jianq Chyun IP Office

(57) ABSTRACT

A light source module adapted for a signboard having a light emitting surface is provided. The light source module includes a base, at least one light source, at least one first reflective structure, and at least three second reflective structures. The base has a bottom and at least one side surface. The side surface is adjacent to the bottom and disposed between the bottom and the light emitting surface. The first reflective structure is adjacent to the side surface and far away from the bottom. The second reflective structures are disposed on the bottom. Part of the light beams provided by the light source ejects from the light emitting surface after reflected by one of the second reflective structures. Another part of the light beams ejects from the light emitting surface after reflected by the first reflective structure and one of the second reflective structures sequentially.

15 Claims, 6 Drawing Sheets

LIGHT SOURCE MODULE

CROSS-REFERENCE TO RELATED APPLICATION

This application claims the priority benefit of Taiwan application serial no. 103143497, filed on Dec. 12, 2014. The entirety of the above-mentioned patent application is hereby incorporated by reference herein and made a part of this specification.

BACKGROUND

1. Technical Field

The disclosure relates to a light source module, and relates particularly to a light source module having a plurality of reflective structures.

2. Description of Related Art

In conventional techniques, often times fluorescent lamps, cold cathode fluorescent lamps (CCFL) and light emitting diodes (LED) are used as a light source for lighting fixtures and advertisement light boxes. When using fluorescent lamps or CCFLs as an illumination light source, there are disadvantages such as it making the applicable product heavy, the usable life span short and the space utility factor low due to the usable life span and the size dimensions of the light source itself. Therefore, public areas are gradually changing to use LEDs as the light source for advertisement light boxes, display lights or notice lights.

Generally speaking, a light emitting method of a light box may be divided into a single side light emitting type and a double side light emitting type, wherein the light box of the double side light emitting type includes a plurality of LEDs and reflective lamp covers disposed on two sides. Light beams generated by the LEDs are transmitted toward the reflective lamp covers from a side thereof and reflected upward and downward respectively, such that the light beams emitted out from the surface of the light box.

However, a majority of the reflective lamp covers of current light boxes in operation have a tablet design and is disadvantageous for performing optical designs to enhance the homogeneity of the emitted light. And if performing surface design, it may also cause an increase in the difficulty of assembly, and be unfavorable for production. Therefore, how to account for the homogeneity of the emitted light and the difficulty of production is an important issue for those skilled in the art in the technical field.

SUMMARY

The disclosure provides a light source module having advantages of good homogeneity and simplified production.

The light source module of the disclosure is adapted for signboards having a light emitting surface. The light source module includes a base, at least one light source, at least one first reflective structure and at least three second reflective structures. The base has a bottom and at least one side surface. The bottom faces the light emitting surface, and the side surface is adjacent to the bottom and located between the light emitting surface and the bottom. At least one light source is disposed at the side surface. At least one first reflective structure is adjacent to the side surface and further away from the bottom and located between the side surface and the light emitting surface. At least three second reflective structures are disposed at the bottom. In a light beam provided by the light source, a part of the light beam ejects from the signboard via the light emitting surface after being reflected by one of the at least three second reflective structures. Another part of the light beam ejects from the signboard via the light emitting surface after being reflected by the first reflective structure and then reflected by one of the at least three second reflective structures sequentially.

Based on the above, the light source module of the embodiments of the disclosure may further control the proportion of the light beam reflected to the light emitting surface by the structural design of the first reflective structure and the second reflective structures, to adjust the homogeneity of the light. In addition, due to the different inclined surfaces of the plurality of second reflective structures, the light source module may achieve good homogeneity, and during optical design prevents difficulty of production caused if the design of the bottom of the base is curved. Also, the size of the mold may be decreased by the symmetrical structure design of the light source module, and a light source module of large dimension may be obtained by fabricating the light source modules in assembly, further decreasing the cost and difficulty of production.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
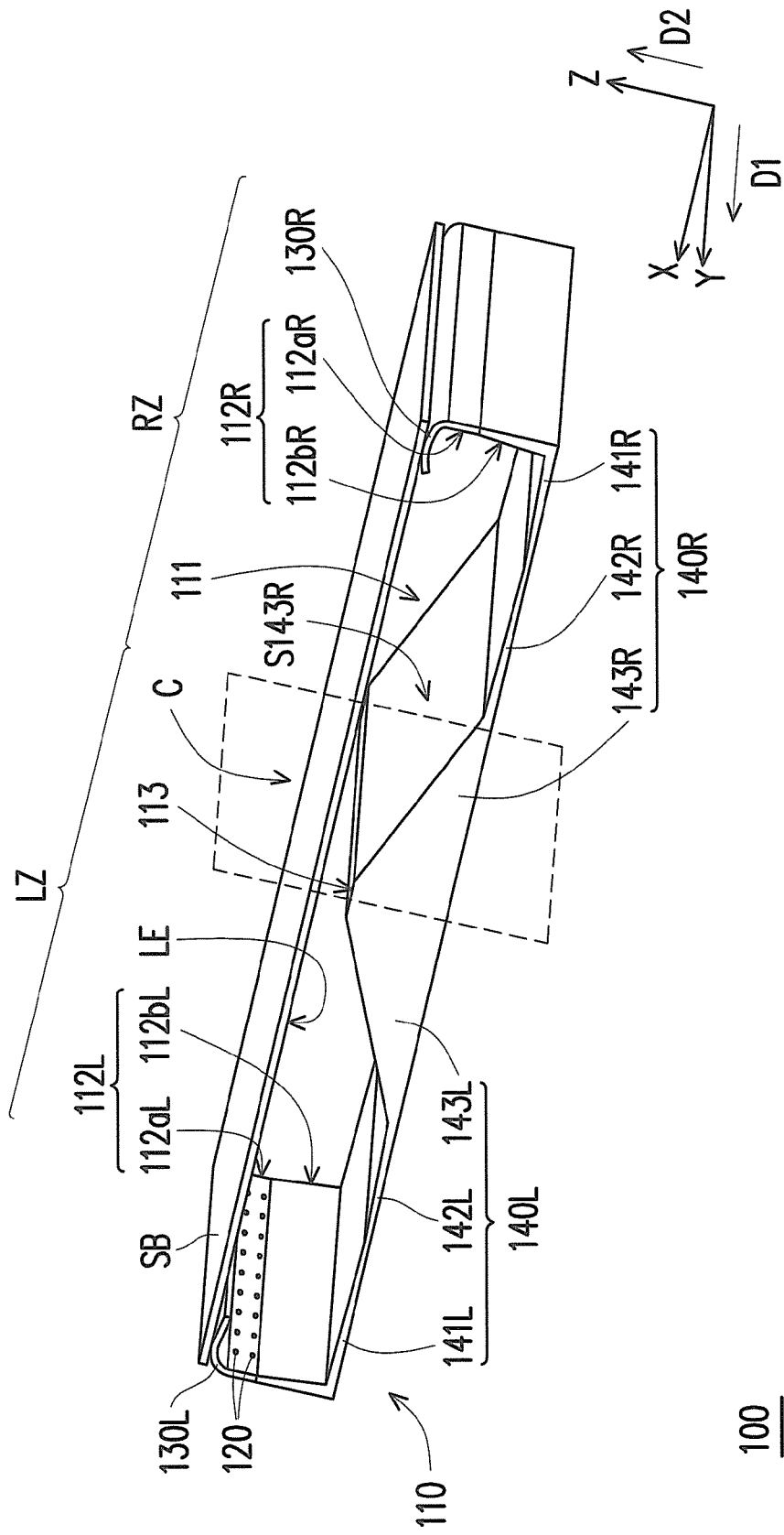
FIG. 1 is an architectural schematic diagram illustrating a light source module according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
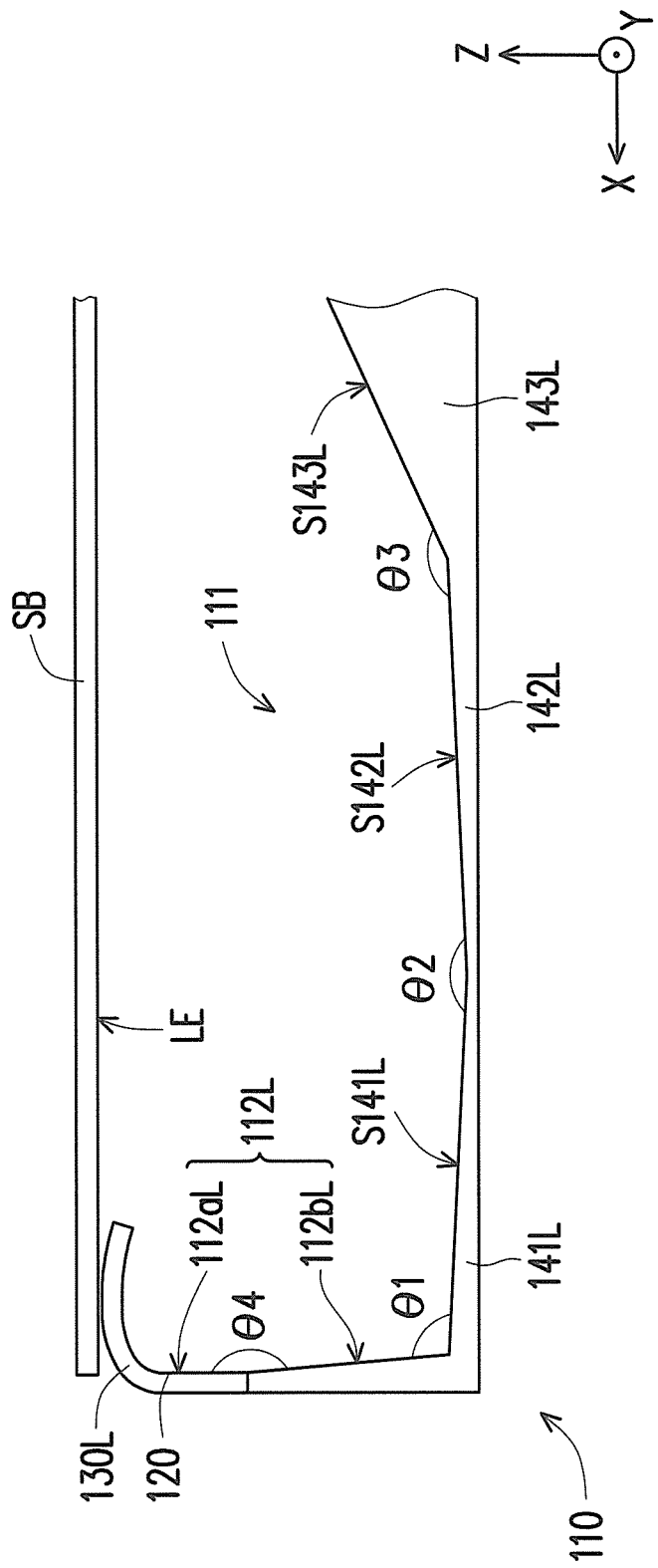
FIG. 2 is a structural schematic diagram illustrating a structure of a first reflective structure and a second reflective structure of FIG. 1.

FIG. 1 is an architectural schematic diagram illustrating a light source module according to an embodiment of the disclosure. FIG. 2 is a structural schematic diagram illustrating a structure of a first reflective structure and a second reflective structure of FIG. 1. Referring to FIG. 1 and FIG. 2, a light source module 100 of the present embodiment is adapted for a signboard SB, where the signboard SB has a light emitting surface LE. The light source module 100 includes a base 110, at least one light source 120, at least one first reflective structure 130L and at least three second reflective structures 141L, 142L, 143L. For example, in the present embodiment, the light source 120 is an LED, but the disclosure is not limited thereto.

More specifically, as shown in FIG. 1, in the present embodiment, the base 110 has a pair of side surfaces 112L, 112R adjacent to a bottom 111 and symmetrical with respect to a central plane C of the base 110 (in the present embodiment, the central plane C refers to a virtual plane parallel with the Y-Z plane). Furthermore, the light source module 100 may also include a plurality of light sources 120, a pair of first reflective structures 130L, 130R and a plurality of second reflective structures 141L, 142L, 143L, 141R, 142R, 143R. Furthermore, the light emitting surface LE is symmetrical with respect to the central plane C, and may be divided into a third part LZ and a fourth part RZ.

More specifically, as shown in FIG. 1, the plurality of light sources 120 are respectively disposed on the pair of side surfaces 112L, 112R. And, the pair of first reflective structures 130L, 130R are adjacent to the pair of side surfaces 112L, 112R respectively and further away from the bottom 111, such that each of the first reflective structures 130L, 130R are located between each of the side surfaces 112L, 112R and the light emitting surface LE. Furthermore, the pair of first reflective structures 130L, 130R are symmetrical with respect to the central plane C. In addition, the plurality of second reflective structures 141L, 142L, 143L, 141R, 142R, 143R are disposed at the bottom 111 mirror symmetrically with respect to the central plane C, that is the second reflective structures 141L, 142L, 143L, 141R, 142R, 143R may be divided into a first part 140L and a second part 140R with respect to the central plane C. In other words, as shown in FIG. 1, the first part 140L includes the second reflective structures 141L, 142L, 143L, and the second part 140R includes the second reflective structure 141R, 142R, 143R. Because the structural relationship of the base 110 is symmetrical with respect to the central plane C, primarily one side of the structure and the light transmitting effect produced thereof will be described later, and the structure of the other side and the light transmitting effect produced thereof will not be repeated.

In the present embodiment, the second reflective structures 141L, 142L, 143L, 141R, 142R, 143R are embossed at the part abutting the central plane C, forming a platform 113 with the base 110, and the embossment is symmetrical with respect to the central plane C. In other words, in the present embodiment, the third inclined surface S143R of the second part 140R, the platform 113 and the third inclined surface S143L of the first part 140L connect with each other to make up the embossment. In addition, the third part LZ and the fourth part RZ of the light emitting surface LE respectively correspond to the second reflective structures 141L, 142L, 143L of the first part 140L and the second reflective structures 141R, 142R, 143R of the second part 140R.

More specifically, as shown in FIG. 2, the bottom 111 of the base 110 faces the light emitting surface LE, and the side surface 112L is adjacent to the bottom 111, and is located between the light emitting surface LE and the bottom 111. In more detail, in the present embodiment, the bottom 111 is located at the X-Y plane, and the first reflective structure 130L is adjacent to the side surface 112L, and further away from the bottom 111 and located between the side surface 112L and the light emitting surface LE. In the present embodiment, a surface of the first reflective structure 130L is a free form surface, however the disclosure is not limited thereto.

On the other hand, as shown in FIG. 2, the second reflective structures 141L, 142L, 143L are disposed at the bottom 111. More specifically, the second reflective structures 141L, 142L, 143L include a first inclined surface S141L, a second inclined surface S142L and a third inclined surface S143L. The first inclined surface S141L is adjacent to the side surface 112L. The second inclined surface S142L is adjacent between the first inclined surface S141L and the third inclined surface S143L, and the third inclined surface S143L is further away from the side surface 112L. More specifically, in the present embodiment, the first inclined surface S141L, the second inclined surface S142L and the third inclined surface S143L respectively correspond to the surface of each of the second reflective structures 141L, 142L, 143L, and the abutting parts between the first inclined surface S141L, the second inclined surface S142L and the third inclined surface S143L respectively face the light emitting surface LE and formed in a dented shape. That is to say, in the present embodiment, the first inclined surface S141L, the second inclined surface S142L and the third inclined surface S143L form a valley like structure.

More specifically, as shown in FIG. 2, in the present embodiment, there is a first angle θ1 included between the side surface 112L and the first inclined surface S141L, and the range of the first angle θ1 is between 95 degrees and 100 degrees. And there is a second angle θ2 included between the first inclined surface S141L and the second inclined surface 142L, and the range of the second angle θ2 is between 170 degrees and 180 degrees, and there is a third angle θ3 included between the structure of the second inclined surface S142L and the structure of the third inclined surface S143L, and the range of the third angle θ3 is between 150 degrees and 160 degrees.

In addition, in the present embodiment, the side surface 112L further has a bearing surface 112aL and a fourth inclined surface 112bL (symmetrically, the side surface 112R has a bearing surface 112aR and an inclined surface 112bR), and the bearing surface 112aL is adjacent between the first reflective structure 130L and the fourth inclined surface 112bL, and the fourth inclined surface 112bL is adjacent between the bearing surface 112aL and the bottom 111. More specifically, in the present embodiment, there is a fourth angle θ4 between the bearing surface 112aL and the fourth inclined surface 112bL, and the range of the fourth angle θ4 is between 170 degrees and 180 degrees.

On the other hand, referring again to FIG. 1, in the present embodiment, the light sources 120 are disposed at the side surface 112L. More specifically, in the present embodiment, the light sources 120 are disposed on the bearing surface 112aL of the side surface 112L, and are arranged in a plurality of columns along a first direction D1 on the side surface 112L, and each light source 120 located in the same column are aligned with each other on the first direction D1, and each of the light sources 120 located in different columns are misaligned on a second direction D2 perpendicular to the first direction D1. In the present embodiment, the first direction D1 for example is parallel with the Y-axis, and the second direction D2 for example is parallel with the Z-axis, however it should not be construed as a limitation to the disclosure. In this way, a light beam 60 emitted by the light source 120 may be ejected from the signboard SB via the light emitting surface LE after being reflected by one of the second reflective structures 141L, 142L, 143L, and therefore good homogeneity may be achieved. In addition, the surfaces described above and shown in FIGS. 1 and 2 are adjoined with each other without gaps therebetween.

Below, the light trail diagram of how the light beam 60 emitted by the light source 120 is transmitted to the light emitting surface LE is described accompanied by FIG. 3A and FIG. 3B.

Figure 3A:
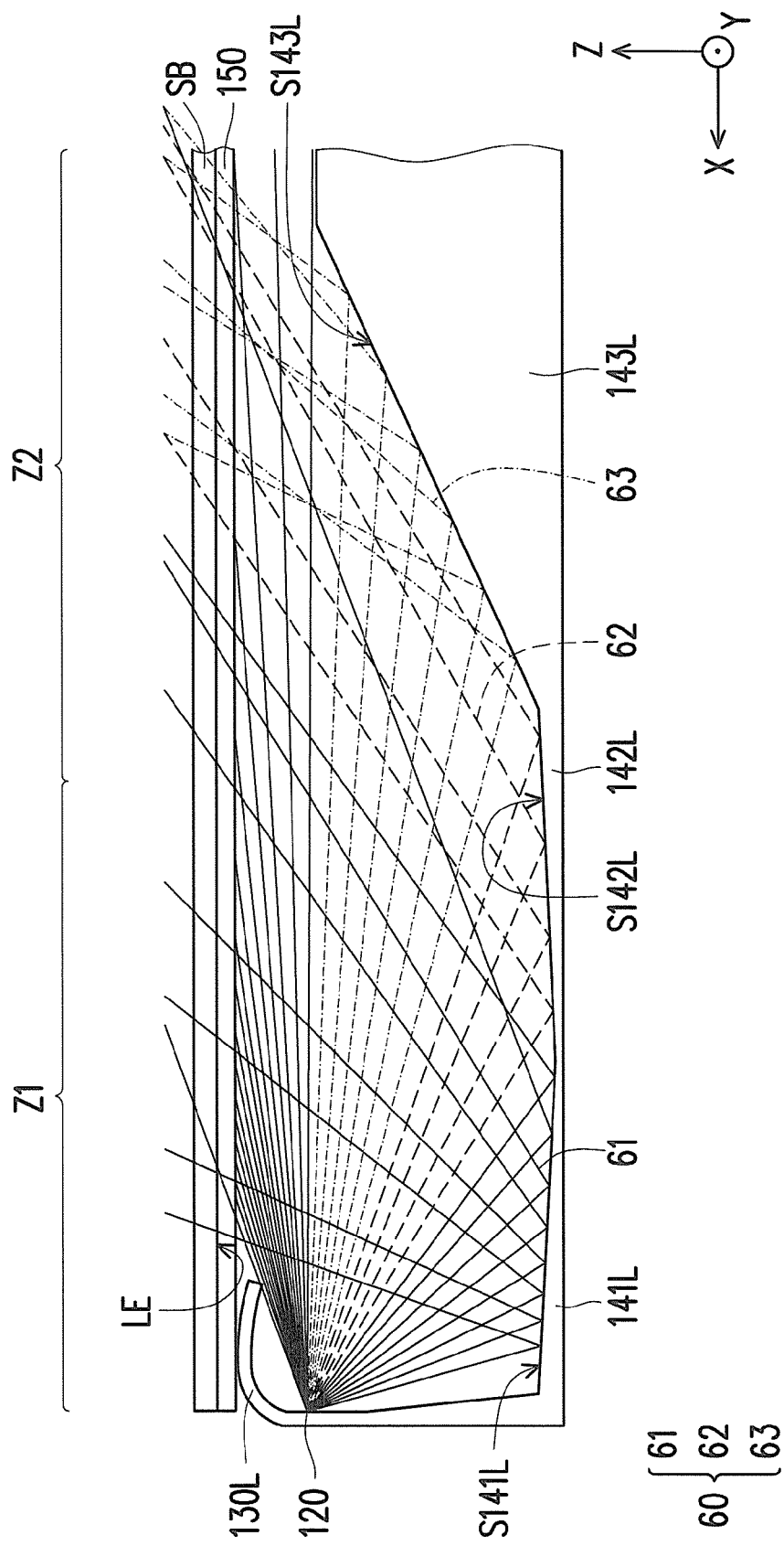
FIG. 3A is a schematic diagram illustrating light beams reflected by the second reflective structure of FIG. 1.

FIG. 3A is a schematic diagram illustrating light beams reflected by the second reflective structure of FIG. 1. FIG.

3B is a schematic diagram illustrating light beams sequentially reflected by the first reflective structure and the second reflective structure of FIG. 1. Referring to FIG. 3A, more specifically, in the light beam 60 provided by the light source 120, a part of the light beam 60 ejects from the signboard SB via the light emitting surface LE after being reflected by one of the second reflective structures 141L, 142L, 143L. For example, as shown in FIG. 3A, a light beam 61 having a larger angle with the horizontal direction (parallel to the X-axis) will be reflected to the light emitting surface LE by the first inclined surface S141L corresponding to the second reflective structure 141L, and ejected from the signboard SB. Furthermore, a light beam 62 and light beam 63 having a smaller angle with the horizontal direction then are respectively reflected to the light emitting surface LE by the second inclined surface S142L and the third inclined surface S143L, and ejected from the signboard SB.

Figure 3B:
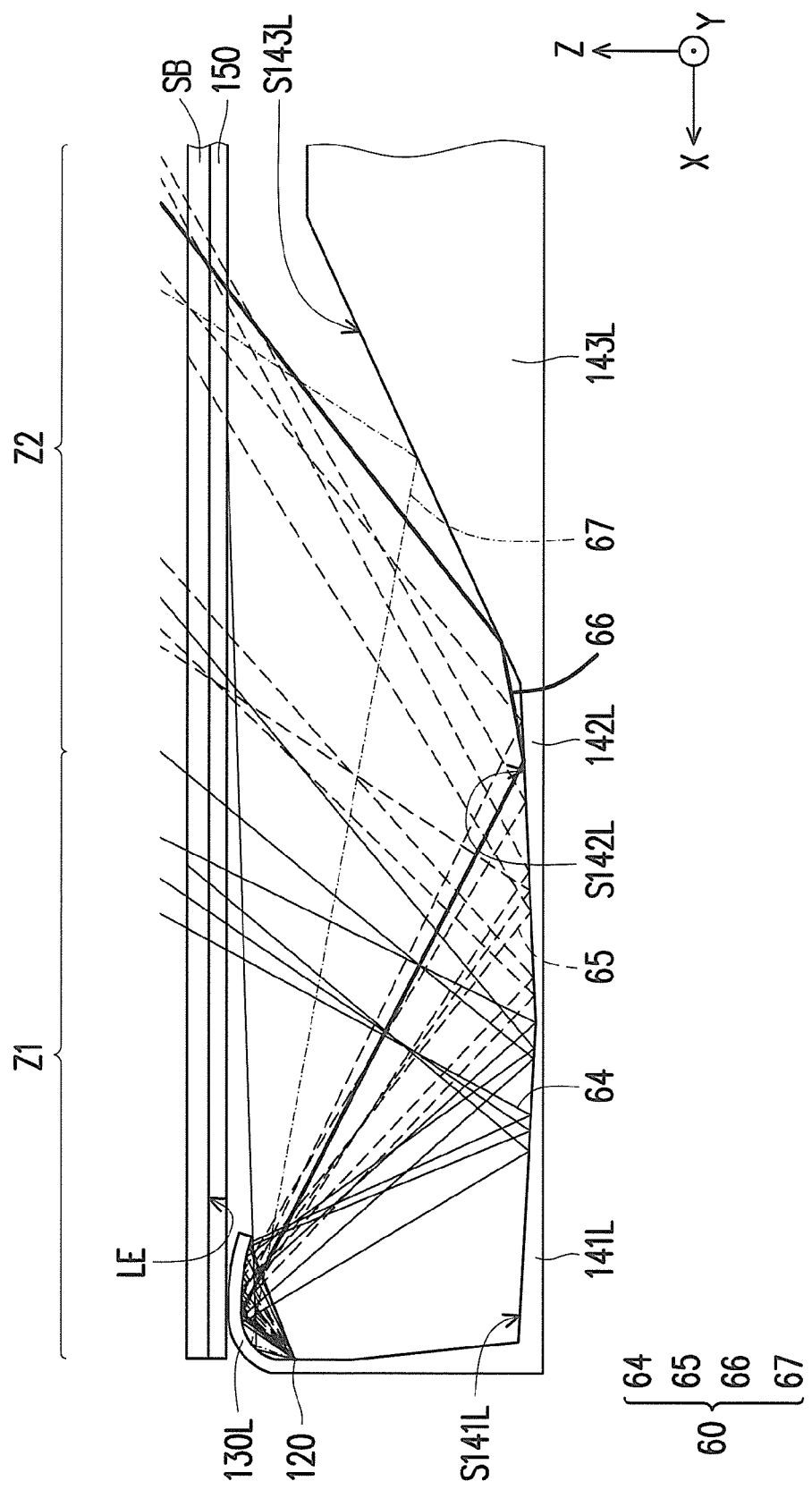
FIG. 3B is a schematic diagram illustrating light beams sequentially reflected by the first reflective structure and the second reflective structure of FIG. 1.

On the other hand, as shown in FIG. 3B, another part of the light beam 60 ejects from the signboard SB via the light emitting surface LE, after being reflected by the first reflective structure 130L and reflected by one of the second reflective structures 141L, 142L, 143L sequentially. For example, as shown in FIG. 3B, after reflected by the first reflective structure 130L, a light beam 64 having a larger angle with the horizontal direction will be reflected to the light emitting surface LE by the first inclined surface S141L corresponding to the second reflective structure 141L, and ejected from the signboard SB. After reflected by the first reflective structure 130L, a light beam 65 having a slightly large angle with the horizontal direction will be reflected to the light emitting surface LE by the second inclined surface S142L corresponding to the second reflective structure 142L. After reflected by the first reflective structure 130L, a light beam 66 having a slightly small angle with the horizontal direction then will be reflected sequentially to the light emitting surface LE by the second inclined surface S142L and the third inclined surface S143L corresponding to the second reflective structures 142L, 143L. After reflected by the first reflective structure 130L, a light beam 67 having a smallest angle with the horizontal direction will then be reflected by the third inclined surface S143L corresponding to the second reflective structure 143L to the light emitting surface LE.

As a result, the light source module 100 may further control the proportion of the light beam 60 reflected to the light emitting surface LE by the structural design of the first reflective structure 130L and the second reflective structures 141L, 142L, 143L. For example, as shown in FIG. 3A and FIG. 3B, the light beam 61 and the light beam 64 reflected to the light emitting surface LE by the first inclined surface S141L will be concentrated at a first region Z1 of the light emitting surface LE. And the light beam 62 and the light beam 65 reflected to the light emitting surface LE by the second inclined surface S142L will be concentrated at a second region Z2 of the light emitting surface LE. And the light beam 63, the light beam 66 and the light beam 67 reflected to the light emitting surface LE by the third inclined surface S143L then may be used to reinforce the light beam 60 at the second region Z2 of the light emitting surface LE. Therefore, the light source module 100 may achieve an effect of adjusting the homogeneity of the light ejected out of the light emitting surface LE.

In addition, referring again to FIG. 1, in this way, the light beam reflected by the second reflective structures 141L, 142L, 143L of the first part 140L emits light through the third part LZ of the light emitting surface LE, and the light beam reflected by the second reflective structures 141R, 142R, 143R of the second part 140R emits light through the fourth part RZ of the light emitting surface LE. More specifically, the light beam emitted by the light sources 120 located at different sides may be symmetrically emitted independently through different regions of the light emitting surface LE by the structural design of the second reflective structures 143L, 143R at the embossment part abutting the central plane C.

In this way, by the structural design of the different inclinations of the plurality of reflective structures, the light source module 100 may achieve good light emitting homogeneity, and further during optical design the difficulty of production caused if the design of the bottom 111 of the base 110 is curved may be prevented. Also, the size of the mold may be decreased by the symmetrical structure design of the light source module 100, and a light source module 100 of large dimension may be obtained by fabricating the light source modules in assembly, further decreasing the cost and difficulty of production. In another embodiment which is not shown of the disclosure, the signboard is a round-shaped structure, such that the reflective structures described above are symmetrically surrounding around an axis orthogonal to the light emitting surface LE.

In addition, as shown in FIG. 3A and FIG. 3B, in the present embodiment, the light source module 100 may further include an optical film 150, located between the base 110 and the light emitting surface LE. When the light beam is reflected to the light emitting surface LE, the light source module 100 may readjust the direction of the emitted light by the optical film 150, to enhance the brightness of the light source module 100 in the frontal direction. For example, in the present embodiment, the optical film 150 may include a prism sheet, a diffusion sheet, or at least one of another optical diaphragm, however the disclosure is not limited thereto.

Figure 4:
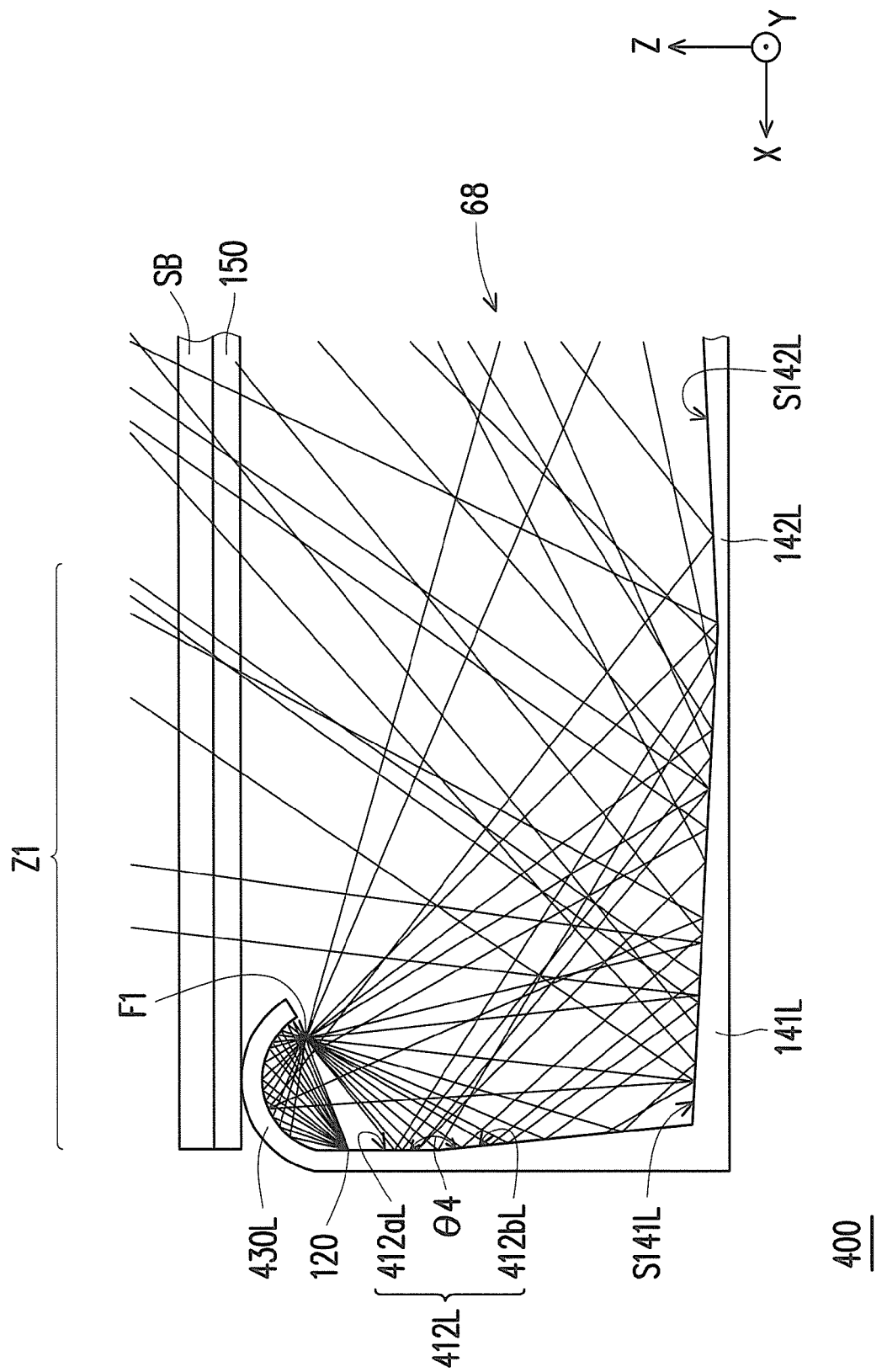
FIG. 4 is an architectural schematic diagram illustrating a light source module according to another embodiment of the disclosure.

FIG. 4 is an architectural schematic diagram illustrating a light source module according to another embodiment of the disclosure. Referring to FIG. 4, a light source module 400 of the present embodiment and the light source module 100 of FIG. 1 are similar, the differences between the two embodiments are described below. The fourth angle θ4 included between the bearing surface 412aL and the fourth inclined surface 412bL of the side surface 412L of the light source module 400 of the present embodiment is approximately between 170 degrees and 180 degrees, and the curvature of the first reflective structure 430L is larger than the curvature of the aforementioned first reflective structure 130L. In this way, the other part of the light beam 60 provided by the light source 120 then may be reflected by the first reflective structure 430L and the fourth inclined surface 412bL sequentially, and ejected from the signboard SB via the light emitting surface LE after reflected by the second reflective structures (for example, 141L or 142L shown in the figure).

Figure 5:
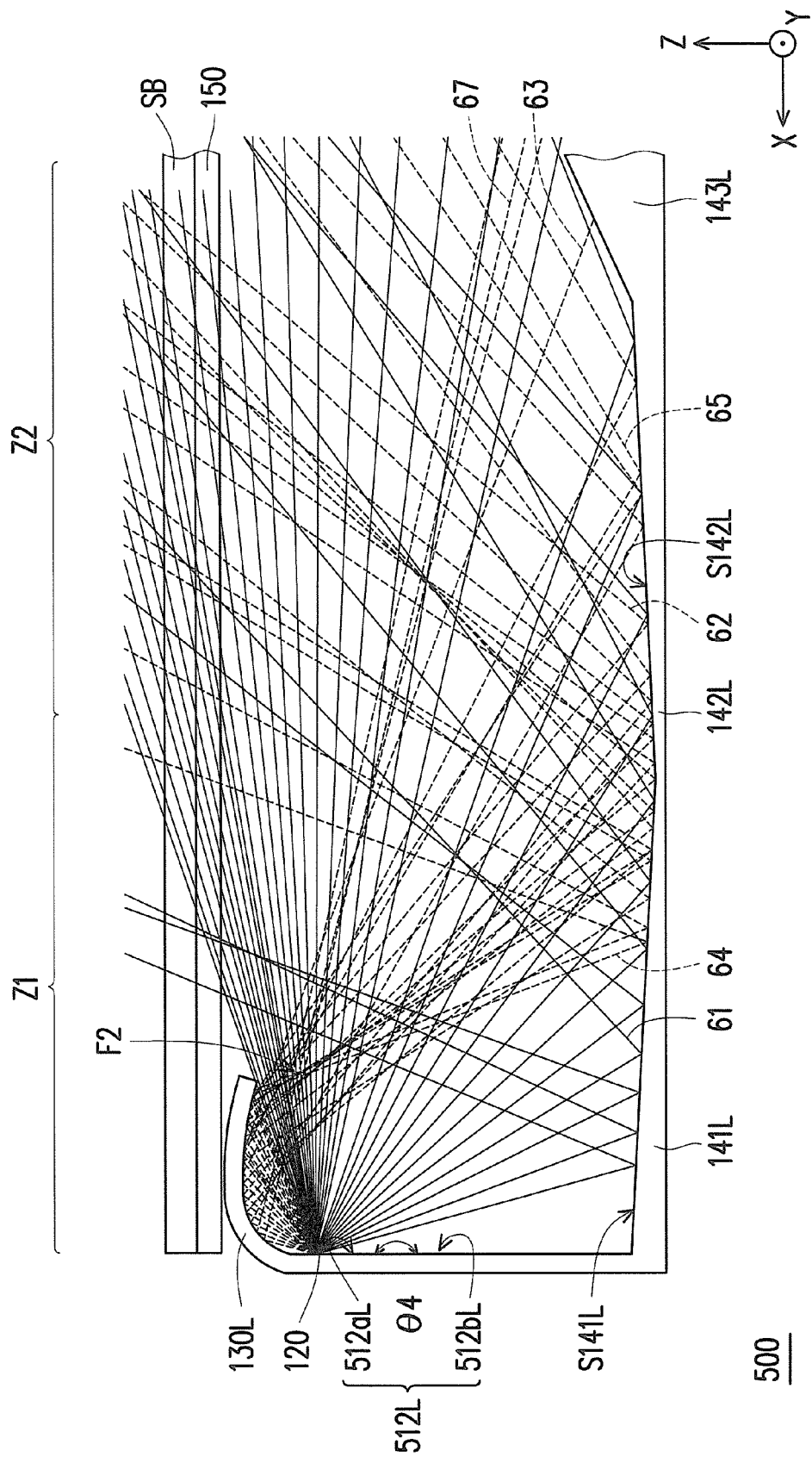
FIG. 5 is an architectural schematic diagram illustrating a light source module according to yet another embodiment of the disclosure.

FIG. 5 is an architectural schematic diagram illustrating a light source module according to yet another embodiment of the disclosure. Referring to the embodiment of FIG. 4 and FIG. 5, because the curvature of the first reflective structure 430L is larger than the curvature of the first reflective structure 130L, an approximate focal point F1 formed by the first reflective structure 430L and the position thereof is different from an approximate focal point F2 formed by the first reflective structure 130L. More specifically, using the X-Y plane of the embodiment as reference, referring to FIG. 4, an orthogonal projection of the approximate focal point F1 on the X-Y plane is located within the range of an orthogonal projection of the first reflective structure 430L on the X-Y plane. Oppositely, referring to FIG. 5, an orthogonal projection of the approximate focal point F2 on the X-Y plane is located outside the range of an orthogonal projection of the first reflective structure 130L on the X-Y plane. Accordingly, a designer may determine the path of the light beam by different curvatures of the first reflective structure.

Furthermore, the light source module 400 also may further control the proportion of the light beam 60 reflected to the light emitting surface LE by the structural design of the first reflective structure 130L and the second reflective structures 141L, 142L, 143L to achieve an effect of adjusting the homogeneity of the light. In addition, due to the different inclined surfaces of the plurality of second reflective structure 141L, 142L, 143L, the light source module 400 may achieve good homogeneity, and during optical design prevents difficulty of production caused if the design of the bottom 111 of the base 110 is curved. Also, the size of the mold may be decreased by the symmetrical structure design of the light source module 400, and a light source module 400 of large dimension may be obtained by fabricating the light source modules in assembly, further decreasing the cost and difficulty of production. Therefore the light source module 400 also may achieve similar effects and advantages as the light source module 100, and will not be repeated here.

Referring to FIG. 5, a light source module 500 of the present embodiment is similar to the light source module 100 of FIG. 1, and the differences between the two embodiments are described below. The bearing surface 512aL and the fourth inclined surface 512bL of the side surface 512L of the light source module 500 of the present embodiment are located on the same plane. In other words, in the present embodiment, the fourth angle θ4 included between the bearing surface 512aL and the fourth inclined surface 512bL is 180 degrees.

Furthermore, the light source module 500 also may further control the proportion of the light beam 60 reflected to the light emitting surface LE by the structural design of the first reflective structure 130L and the second reflective structures 141L, 142L, 143L to achieve an effect of adjusting the homogeneity of the light. In addition, due to the different inclined surfaces of the plurality of second reflective structure 141L, 142L, 143L, the light source module 500 may achieve good homogeneity, and during optical design prevents difficulty of production caused if the design of the bottom 111 of the base 110 is curved. Also, the size of the mold may be decreased by the symmetrical structure design of the light source module 500, and a light source module 500 of large dimension may be obtained by fabricating the light source modules in assembly, further decreasing the cost and difficulty of production. Therefore the light source module also may achieve similar effects and advantages as the light source module 100, and will not be repeated here.

In summary, the light source module of the embodiments control the proportion of the light beam reflected to the light emitting surface by the structural design of the first reflective structure and the second reflective structure, and may achieve an effect of adjusting the homogeneity of the light. In addition, due to the different inclined surfaces of the plurality of second reflective structure, the light source module may achieve good homogeneity, and during optical design prevents difficulty of production caused if the design of the bottom of the base is curved. Also, the size of the mold may be decreased by the symmetrical structure design of the light source module, and a light source module of large dimensional may be obtained by fabricating the light source modules in assembly, further decreasing the cost and difficulty of production.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A light source module, adapted for a signboard having a light emitting surface, the light source module comprising:
   a base, having a bottom and at least one side surface, in which the bottom faces the light emitting surface and the side surface is adjacent to the bottom and is located between the light emitting surface and the bottom;
   at least one light source, disposed at the side surface;
   at least one first reflective structure, adjacent to the side surface and further away from the bottom and located between the side surface and the light emitting surface; and
   at least three second reflective structures, disposed at the bottom, wherein in light beams provided by the light source, part of the light beams eject from the signboard via the light emitting surface after being reflected by one of the at least three second reflective structures, and another part of the light beams eject from the signboard via the light emitting surface after being reflected by the first reflective structure and reflected by one of the at least three second reflective structures sequentially.

2. The light source module as claimed in claim 1, wherein the at least three second reflective structures comprise:
   a first inclined surface, adjacent to the side surface;
   a second inclined surface; and
   a third inclined surface, in which the second inclined surface is adjacent between the first inclined surface and the third inclined surface, and the third inclined surface is further away from the side surface.

3. The light source module as claimed in claim 2, wherein the first inclined surface, the second inclined surface and the third inclined surface form a valley structure.

4. The light source module as claimed in claim 2, wherein there is a first angle included between the side surface and the first inclined surface, and a range of the first angle is between 95 degrees and 100 degrees.

5. The light source module as claimed in claim 2, wherein there is a second angle included between the first inclined surface and the second inclined surface, and a range of the second angle is between 170 degrees and 180 degrees.

6. The light source module as claimed in claim 2, wherein there is a third angle included between the second inclined surface and the third inclined surface, and a range of the third angle is between 150 degrees and 160 degrees.

7. The light source module as claimed in claim 1, wherein the side surface has a bearing surface and a fourth inclined surface, in which the bearing surface is adjacent between the first reflective structure and the fourth inclined surface, and the fourth inclined surface is adjacent between the bearing surface and the bottom, and the light source is disposed at the bearing surface, and another part of the light beams of the light source eject from the signboard via the light emitting surface after being reflected by the first reflective structure and the fourth inclined surface sequentially.

8. The light source module as claimed in claim 7, wherein there is a fourth angle included between the bearing surface and the fourth inclined surface, and a range of the fourth angle is between 170 degrees and 180 degrees.

9. The light source module as claimed in claim 7, wherein the bearing surface and the fourth inclined surface are located on a same plane.

10. The light source module as claimed in claim 1, wherein the base has a pair of side surfaces, adjacent to the bottom and symmetrical with respect to a central plane of the base, the light source module comprise:
   a plurality of light sources, respectively disposed on the pair of side surfaces;
   a pair of first reflective structures, respectively adjacent to the pair of side surfaces and further away from the bottom, such that the first reflective structures are located between the side surfaces and the light emitting surfaces respectively, and the pair of first reflective structures are symmetrical with respect to the central plane; and
   a plurality of second reflective structures, disposed at the bottom mirror symmetrically with respect to the central plane, and the second reflective structures are embossed at the part abutting the central plane, forming a platform with the base, and the embossment is symmetrical with respect to the central plane.

11. The light source module as claimed in claim 10, wherein the second reflective structures is divided into a first part and a second part with respect to the central plane, and the light emitting surface is symmetrical with respect to the central plane and is divided into a third part and a fourth part, and the first part and the second part respectively correspond to the third part and the fourth part, and the light beams reflected by the second reflective structures of the first part emit through the third part of the light emitting surface and the light beams reflected by the second reflective structures of the second part emit through the fourth part of the light emitting surface.

12. The light source module as claimed in claim 10, wherein the at least one light source is a plurality of light sources, and the light sources are arranged in a plurality of columns along a first direction on the side surface, and each light source located in the same columns are aligned with each other on the first direction, and each of the light sources located in different columns are misaligned on a second direction perpendicular to the first direction.

13. The light source module as claimed in claim 1, wherein a surface of the first reflective structure is a free form surface.

14. The light source module as claimed in claim 1, wherein an orthogonal projection of an approximate focal point of the first reflective structure on the base is located within a range of an orthogonal projection of the first reflective structure on the base.

15. The light source module as claimed in claim 1, wherein an orthogonal projection of an approximate focal point of the first reflective structure on the base is located outside a range of an orthogonal projection of the first reflective structure on the base.

* * * * *